March 17, 1970  MINATO KAWAGUTI  3,501,643
FLYING IMAGE DIGITIZER UTILIZING MEANS FOR SWEEPING THE FOCUSED
IMAGE PAST A LINEAR ARRAY OF PHOTODETECTORS AND GRATING MEANS
FOR LOCATING RECORDED DATA IN SPACE AND TIME
Filed Oct. 10, 1968  4 Sheets-Sheet 1

INVENTOR.
MINATO KAWAGUTI
BY

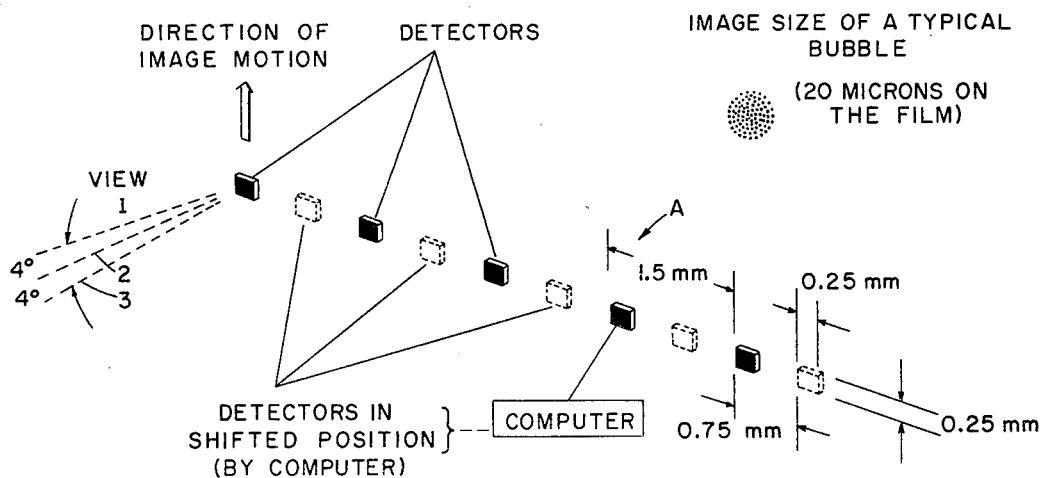
Fig. 2
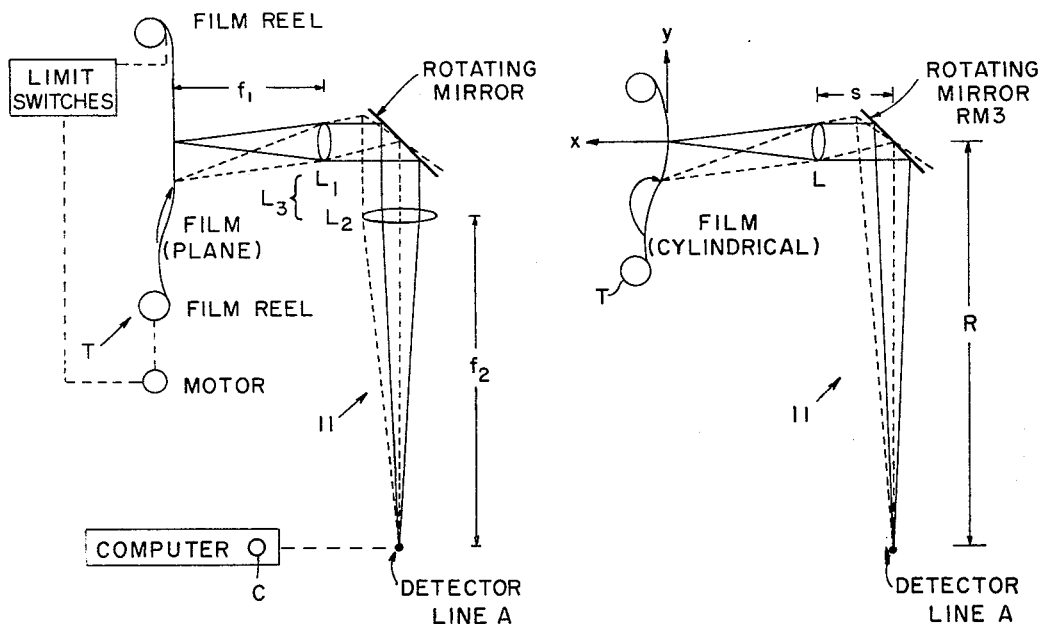
Fig. 5
Fig. 6

|— 0.1 sec —|

36 μ

3,501,643
Patented Mar. 17, 1970

3,501,643
FLYING IMAGE DIGITIZER UTILIZING MEANS FOR SWEEPING THE FOCUSED IMAGE PAST A LINEAR ARRAY OF PHOTODETECTORS AND GRATING MEANS FOR LOCATING RECORDED DATA IN SPACE AND TIME
Minato Kawaguti, Upton, N.Y., assignor to the United States of America as represented by the United States Atomic Energy Commission
Filed Oct. 10, 1968, Ser. No. 766,416
Int. Cl. G01n 21/30; H01j 39/12
U.S. Cl. 250—219
10 Claims

ABSTRACT OF THE DISCLOSURE

Flying image digitizer for bubble chamber film having light and dark portions corresponding to nuclear particle tracks for the rapid, electronic recording, interpretation and selection of bubble chamber pictures of said nuclear particle tracks, having a plurality of fixed photo-sensors, rotating mirrors for rotating enlarged images of stationary bubble chamber film frames past the photo-sensors for detecting the light and dark portions of the frames, and precision grating means for locating in time and space the light and dark portions detected whereby electronic pulses are produced corresponding to the detected portions for recording in a computer that may be programmed for selection and interpretation of predetermined nuclear particle events.

BACKGROUND OF THE INVENTION

Field of the invention

In the field of physics a need exists for apparatus and method for rapidly, automatically, scanning frames of bubble chamber film of the type having discrete portions of different optical density corresponding to the tracks of charged particles in a bubble chamber.

Description of prior art

One method and apparatus used to scan bubble chamber film is described and shown in U.S. Patent 3,345,120 to Palmer and while the system of this patent has been useful for such scanning, this system has required precision stages for accurately continuously moving a web of the bubble chamber film past a flying spot of light that has moved back and forth in an accurate raster display for light detection of the light passing through the film one point at a time. Moreover, this system has involved a coordinate determination with a flying light spot of about 15 μm. in. in diameter that has rapidly moved back and forth to form scan lines about 30μ apart. Additionally, a complete scan of each picture frame has required about 10 seconds or more whereby it has been difficult for the scanning rate to keep up with the output film rate of the bubble chambers.

BRIEF SUMMARY OF THE INVENTION

The invention described herein was made in the course of, or under a contract with the United States Atomic Energy Commission.

This invention provides apparatus and method for scanning a stationary bubble chamber film frame by moving an image of the frame past a linear array of photo-sensors. In one embodiment, the photo-sensors comprise a plurality of discrete, spaced-apart, photo-sensitive detectors arranged in a linear array along a line segment for detecting the incident light intensity and the variation with time of an area of the image focused upon each of the detectors. More particularly, in one embodiment, a moving image of a stationary bubble chamber film frame is generated by a rotating mirror that moves the image past a linear array of photo-sensitive detectors while a precision grating is used as a reference for relating the detected incident light intensity to a precise portion of the film for the rapid and accurate location of the bubble chamber track image and the accurate, rapid and automatic digitization thereof for storage in a computer. In another aspect, this invention provides a flying image digitizer system hereinafter referred to as an FID, having provision for normal and orthogonal scans of three different dimensional views of the same bubble chamber events. With the proper selection of elements and steps, as described in more detail hereinafter, the desired bubble chamber scanning is achieved.

The above and further novel features of this invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE SEVERAL VIEWS OF THE DRAWINGS

In the drawings, where like elements are referenced alike:

FIG. 2 is a detailed three dimensional view of the embodiment of the detector array of FIG. 1;

FIG. 5 is a partial schematic view of the projection optics of the system of FIG. 1 illustrating the axis of rotation of the rotating mirror thereof;

FIG. 6 is a partial schematic view of the projection optics of the system of FIG. 1 illustrating detectors thereof placed on a line perpendicular to the surface of the plane of the paper of the drawing;

DETAILED DESCRIPTION

The FID of this invention is simple in structure and operation and yet accurate and fast when compared to the above-referenced Palmer scanner, which is embodied in the HPD Mark II digitizer now in use at the Brookhaven National Laboratory. For example, the total time required to digitize three views on the FID of this invention, including both normal and orthogonal scans for one 80" bubble chamber frame, is 2 seconds compared with 35 seconds on the Mark II; also, the FID of this invention has a light spot size of 10 microns square whereas the Mark II light spot size is 15 microns in diameter. Moreover, it will be understood, as described in more detail hereinafter, that the capability for film measurement with the FID of this invention can substantially correspond to the exposure rate of any currently existing bubble chamber cameras employing small or large demagnification factors.

The heart of the FID of this invention is a linear array of solid-state photo-sensitive detectors, across which an enlarged optical image of the picture is swept. Advantageously, about 1,000 detectors arranged in a straight line make up the array, each having a sensitive area 250

μm. square. Each detector, operating independently, generates a pulse every time a bubble image is encountered, and the coordinates of the bubble image center are encoded by reference to a precision grating superimposed at the edge of the picture. In one embodiment, described in more detail hereinafter, an area 1.5 m. x 1.5 m. of the image is swept past the detector array in 1/6 sec. with a magnification of about 25, so that the corresponding area of the film is 60 mm. x 60 mm. Thus, the scanning of size 60 mm. x 60 mm. frames, each with 1000 parallel scan lines, is accomplished every second.

Figure 1:
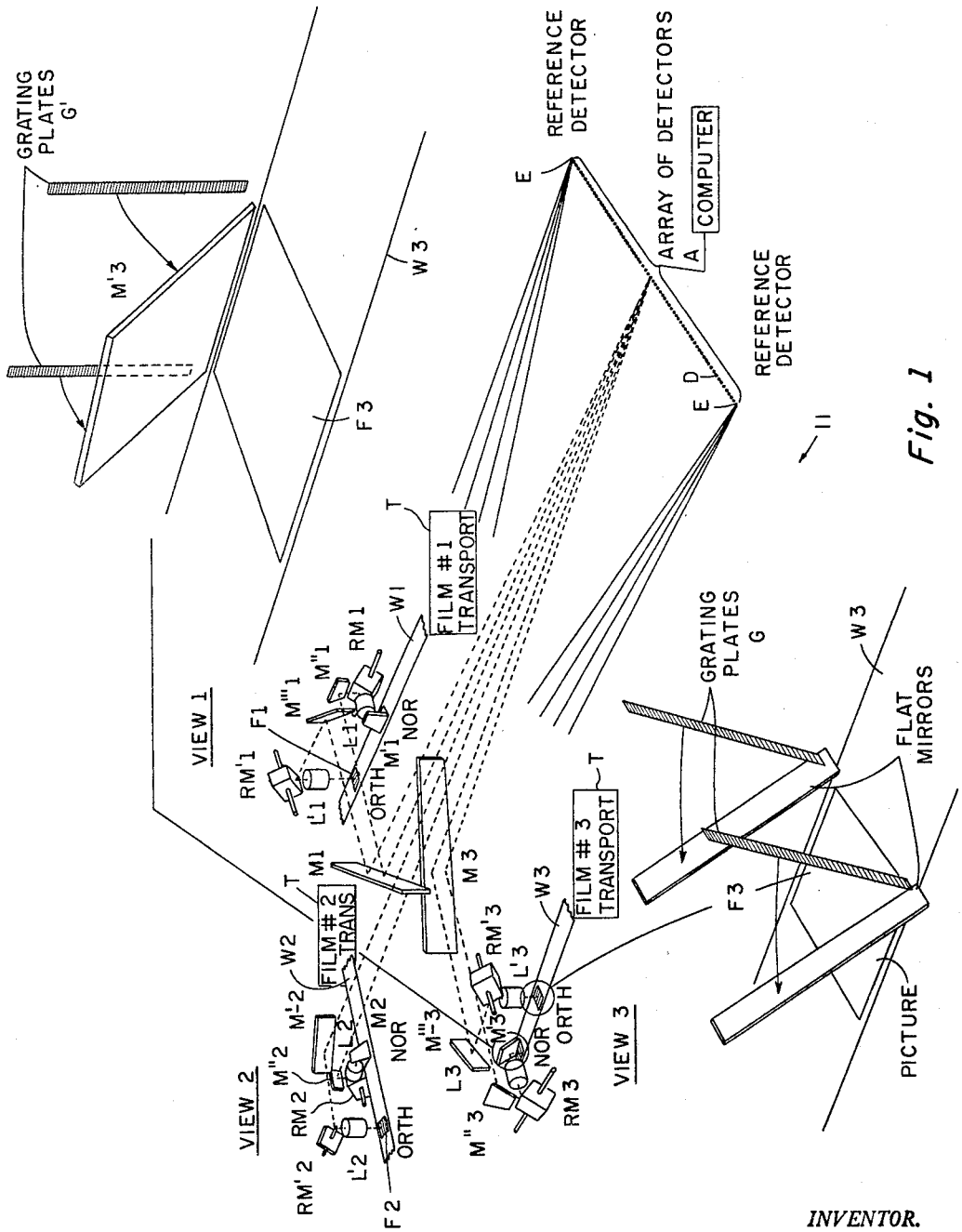
FIG. 1 is a partial three dimensional view of the system of this invention.

Referring now to FIG. 1, the FID apparatus 11 of this invention, comprises a linear array A of photo-sensitive detectors D on which three corresponding optical systems rotate a flying image of a stationary bubble chamber film frame. The first optical system, comprises two rotating mirrors RM1 and RM'1 that reflect the rotating image of frame F1 across lens means L1 and L'1 and half silvered mirrors M1 and M'''1, and from silvered mirrors M'1, and M''1 onto detector array A, as shown by the dashed lines in FIG. 1; the second optical system, comprises two like rotating mirrors RM2 and RM'2, like lens, means L2 and L'2 and like silvered mirrors M2, M'2 and M''2 for rotating enlarged images of another bubble chamber picture frame F2 across detector array A; and the third optical system, comprises like rotating mirrors RM3 and RM'3, like lens means L3 and L'3, like half silvered mirror M3 and silvered mirrors M'3, M''3 and M'''3 for rotating an image of frame F3 and gratings G and G' across detector array A. The rotating mirrors in each optical system identically comprise four rectangularly arranged mirror planes that each sequentially rotate an image of a respective frame across the detector array and each optical system has duplicate rotating mirrors for projecting illuminated images of normal and orthogonal views of three different respective bubble chamber picture frames of the same bubble chamber events across detector array A. In this regard, conventional practice provides for the simultaneous exposure of three respective picture frames in three different cameras arranged at three different locations around the bubble chamber to provide pictures in three dimensions of the same events, thus to avoid ambiguity as to direction and location of the tracks. Since the three optical systems respectively are substantially identical in structure and identical in operation, the third system having rotating mirrors RM3 and RM'3 will be described in detail for ease of explanation, it being understood that each of the other two corresponding systems has like elements that operate identically. Also, each optical system may have two optical gratings like gratings G and G', but for ease of explanation, this third system that will be described is the only system shown with these gratings in FIG. 1.

The rotating mirrors RM3 and RM'3 are arranged in two separate corresponding optical units, one for normal scan of one bubble picture frame F3, i.e. for scan lines orthogonal to the film edge of the frame, and the other for orthogonal scan i.e. for scan lines parallel to the film edge of the frame.

The configuration of the mentioned projection lens means L3 and L'3, mirror means M3, M'3, M''3 and M'''3, and the rectangularly arranged planes of mirrors forming mirrors RM3 and RM'3 are arranged in such a way that each one of the planes of mirrors moves a projected image of one picture frame in an identical manner across the detector array. The actual direction of scanning on each frame differs, however, by 90 degrees between normal and orthogonal scans in each unit. Digitizing of a frame by one thousand scan lines can be executed in a single sweep of the image by one plane of a mirror, if a thousand detectors are arranged on the detector array. The relative location in space and time is provided by a like scan of precision optical gratings G and G', whereby the rotating mirrors move an image thereof across suitable end detectors E simultaneously with the scan of the frame image across the detector array A.

As will be understood by one skilled in the art, each rotating mirror rotates at a constant angular velocity, advantageously one-quarter revolution per second, and the phase relations of rotation among the various optical systems is chosen in such a way that after the scan of one frame is finished, the image of the next frame in one of the other systems begins to fall upon the detector array A. Six different means (or, a triad in two modes) are thus digitized successively in one cycle in one second.

In order to make the use of one thousand detectors practical the detectors comprise compact reliable photosensors, such as photo-field effect transistors. Additionally, these detectors should advantageously have a well-defined sensitive area 250 microns square, relatively high sensitivity and fast response. One suitable detector is the FF 409 photo-field effect transistor manufactured by the Crystalanics Co., of Massachusetts, U.S.A.

FIG. 2 illustrates the preferred arrangement of one practical embodiment of array A of detectors D. The black squares represent the photo-sensitive areas of the detectors. A picture frame 60 mm. x 60 mm. in size is projected by lens means L3 and L'3 as an image magnified by a factor of 25. As a result, each detector picks up light from a 10 micron square area of the frame. Also, the distance between the centers of neighboring detectors is 1.5 mm. corresponding to a scan line spacing of 60 microns. However, narrower spacing is achieved by displacing the whole array A to the position indicated by the broken line squares after one sweep of an image and the same image is swept once more to get, in effect, 30 microns spacing.

Advantageously, the detectors are divided into groups of 60. In each group, the photosensors are prealigned accurately on a chip to provide the desired spacing of 1.5 mm. in a straight line segment to form the detector line in array A. In this regard, each line segment of detectors on a chip may be adjusted with the same or slightly different tilt angles relative to the "detector line" of array A to enhance efficiency of analysis.

Figure 3:
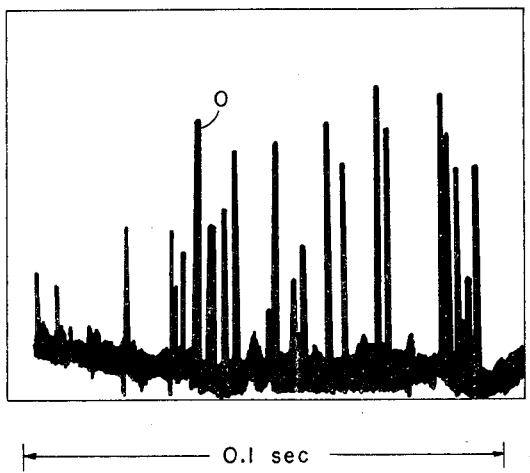
FIG. 3 is a graphic representation of a cathode ray trace of a signal from a detector of the array of FIG. 2.
Figure 4:
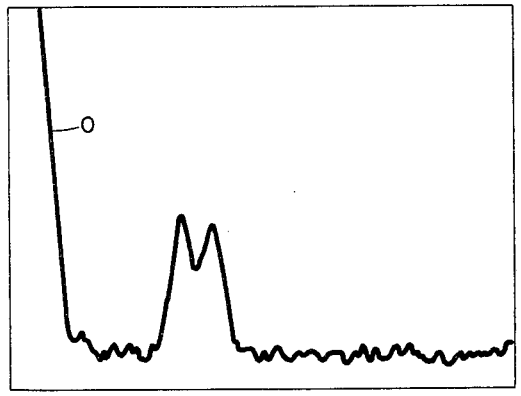
FIG. 4 is a graphic representation of an example of the spatial resolution of a signal from a detector of the array of FIG. 2.

Examples of oscilloscope traces of a signal output O obtained from a detector D are illustrated in FIGS. 3 and 4. In these illustrations, a 30" bubble chamber film frame exposed to events produced by 0.7 GeV./cK− (or kaon minus) beam was used. The trace of FIG. 3 covers about three quarters of the entire width of the 30" bubble chamber. The double-peaked output signal O represented by the trace of FIG. 4 illustrates detection of two transparent portions of a picture of two very close bubbles, whereas the peak at the left thereof, illustrates the signal O from a detector for a track of good contrast between the opaque and transparent portions of the film frame, such as frame F3.

In the operation of each optical unit, the distances $f_1$ and $f_2$ of each lens means, e.g. lens means L3 and L'3, are chosen to coincide with the focal lengths of two projection lenses respectively. As shown in FIG. 5, if the lens $L_1$ has a focal length of 150 mm., then lens $L_2$ has a 3.8 m. focal length. The frame is mounted on a flat surface with the magnification factor determined by the ratio $f_2/f_1$. With two lenses that are ideal, the projected enlarged image that is seen by the detectors D is distortion free throughout the frame. Thus, stability and alignment of direction of the axis of rotation of the rotating mirror is important but not the angular position thereof and any change of sweep speed thereof will not introduce any distortion. The stationary stage for the film is a flat plane as shown in FIG. 5, or alternately cylindrical, as shown in FIG. 6. The scan of the grating across the edge of the detector array corresponds therewith.

Normal and orthogonal scans are executed by the two independent units in each optical system, two different positions of a film frame and like scans of gratings G and G' being submitted to each of them. To this end, these two frame positions are provided by placing the conventional film web on a common support plane to make the film advance easier.

Advantageously, the film advances from one of the positions to the next position while the optical units are idle. Suitable fast film advance mechanisms T are used to this purpose. If the memory capacity of the computer is large enough to accept digitized data of at least several triads simultaneously, the time delay between digitizing in the normal and orthogonal modes is of no consequence, and a relatively slow film advance, illustrated in FIG. 7b, is possible.

Coupling to the computer is analogous to the basic system employed heretofore, for example, with the above-referenced existing Mark II machine. To improve the efficiency, however, suitable buffering and data organization within the skill of the art may be employed to avoid possible loss of information that might occur if the conventional computer were not prepared for heavy bursts of digitizing output caused by an encounter of the detector array with fractions of tracks that are accidentally parallel to the detector array A.

Figure 7A:
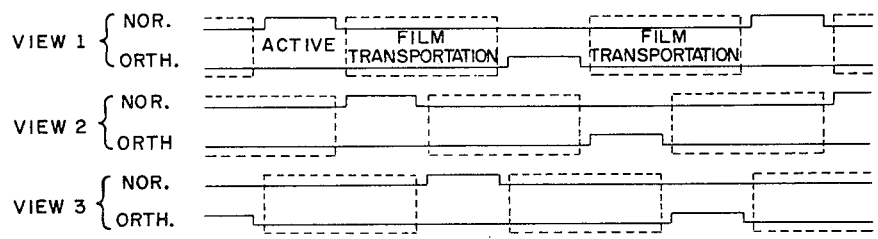
FIGS. 7a and 7b are graphic representations of timing schemes of the six units of FIG. 1 illustrating that the mirror thereof sweeps the whole of one frame (60 mm. x 60 mm.) in an angular displacement of 13 degrees whereby film transportation can be executed while each of the units is idle (shown by broken lines).
Figure 7B:
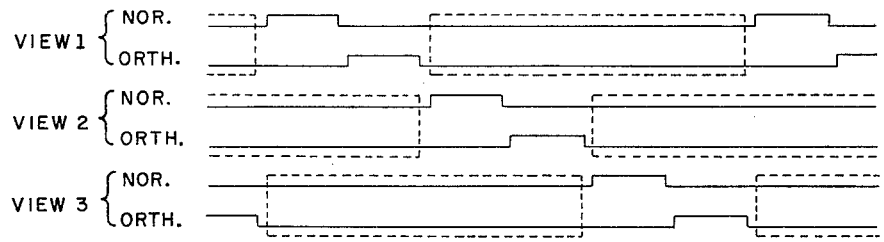

In one sequence, illustrated in FIG. 7a, the normal scanning motion of an enlarged image of a frame, such as frame F3, across the detector array A is accomplished in one phase by the rotation of one mirror plane of one rotating mirror RM3 in one optical system, by revolving rotating mirror RM3 at the small constant angular velocity of ¼ revolution per second. To this end the rotating mirror is revolved by a conventional constant speed motor having suitable gears and auxiliary current control means, such as an electronic phase control means, or other standard motor speed control means. A stroboscope tachometer or other conventional means, such as described in U.S. patent application S.N. 659,717, filed May 16, 1957, determines the desired revolution speed. As will be understood in the art, the rotating elements are the only parts of this invention subjected to mechanical motion during the time the single frame is being digitized. Thus, since one plane of each of the six identical rotating mirrors sequentially projects their respective images on the common detector array A one at a time with each rotating mirror having a duty cycle of 13°/90°, time-sharing of the detectors by the six rotating mirrors makes the detectors devote 90% of their operating time to digitizing in a simple trouble free manner.

In the above-mentioned sequence, the orthogonal scanning of an enlarged image of frame F3 across the detector array A is accomplished in another phase by the rotation of one plane of rotating mirror RM3. To this end, the frame F3 is transported from adjacent rotating mirror RM3 to a stationary position adjacent rotating mirror RM'3 whereby a mirror plane of the latter operates to move a reflected enlarged image of the frame past detector array A after frames F1 and F2 are scanned normally in other phase in their other optical systems. Advantageously, frames F1, F2 and F3 are sequentially scanned normally in first, second and third phases and frames F1, F2 and F3 are sequentially scanned orthogonally in fourth, fifth and sixth phases with the film frames being moved between phases. In all these film movements, a conventional simple film transport system T for the film webs, such as shown in FIG. 5 is used which merely moves the film frames to their appropriate locations and relatively little care need be given to the accuracy of film movement during the actual film movement.

In review of the six phases of the mentioned sequence, frames F1, F2 and F3 are sequentially scanned normally in first, second and third phases, and scanned orthogonally in fourth, fifth, and six phases, whereby there is a time delay between the normal and orthogonal scans of each frame. The respective frames are moved from one rotating mirror to the next rotating mirror in each optical system and after this sequence, a time delay is provided whereby the next triad of frames of another set of bubble chamber events is digitized by a like sequence by moving the film webs W1, W2 and W3 so that each frame of this next triad is sequentially brought to a stationary position adjacent each rotating mirror in each optical system.

When digitizing the bubble chamber pictures at the highest speed mentioned above, which is determined by the ¼ r.p.s. speed of rotation of the rotating mirrors in each optical system up to 100,000 to 300,000 points can be digitized every second. Thus, the largest high speed computers, such as computer C shown in FIG. 5, can be used. To enhance this use, an efficient data reduction can be used in suitable computer buffers wherein a hybrid electronics-computer program can be used for given track recognition. To this end, the apparatus and method of this invention have the significant advantage that the large number of closely spaced independent detectors provided can scan an individual bubble chamber picture frame in parallel, with adjacent detectors confirming the existence or absence of a bubble on the bubble chamber picture frame. On the other hand, since a group of bubbles that are close to one another cause a number of "hits," i.e. detector pulses, localized both in position on the detector line and in time as to when the detection thereof occurs, the computer can recognize when this occurs.

In actual tests, reflected by the graphic illustrations of FIGS. 3 and 4 a computer program was written that converts the original digitized data of the above-mentioned HPD device into the output format of the FID (flying image digitizer) of this invention. Using the simulated FID data thus generated, electronic track recognitions were tested with the use of another computer program that simulates the track recognition circuitry.

In these tests a 35 mm. film picture from a BNL bubble chamber, as digitized by the BNL HPD Mark I, was divided into a number of parallel strips, each containing 16 scan lines. Each strip was isolated completely from the remaining part of the picture and a method for finding track segments using only the output of 16 consecutive detectors was tested. The track segment output by the program were plotted as short line segments with all the digitized points superimposed. No information covering neighboring track segments need be used in finding a segment within the strip. A more elaborate program using such information for comparison can also be used, however.

This invention has the advantage of providing bubble chamber scanning apparatus having both simple mechanical and optical structures. In this regard, the heretofore known problems of construction, alignment, maintenance and continuous accurate film movement are reduced significantly or entirely eliminated. Moreover, the signal quality and resolution compares favorably with existing apparatus while the rate of digitization is much faster than with existing scanning machines whereby the scanning apparatus of this invention is capable of handling the film of even the most advanced bubble chambers, including those producing quite small diameter bubble images of as little as from 5 to 10 $\mu$m. In this regard, this invention can be used with the most modern, most powerful high speed computers whereby it can feed the computers substantially without limitation with as much information as they can accept. Additionally, this invention provides the significant advantage of parallel multiple detector operation for enhanced unambiguous bubble chamber picture digitization and pattern recognition.

What is claimed is:

1. Method for scanning bubble chamber film having transparent and opaque portions corresponding to nuclear particle tracks in a bubble chamber, comprising moving the image of a bubble chamber film frame (F3) across a linear array (A) of photo-sensitive detectors (D) whereby said detectors (D) produce electrical outputs (O) corresponding respectively to the transparent portions of the image moved across said detectors (D).

2. The invention of claim 1 wherein an enlarged image of said bubble chamber film frame (F3) is moved across said linear array (A) of detectors (D).

3. The invention of claim 1 wherein normal and orthogonal images of said bubble chamber frame (F3) are moved across said linear array (A) of detectors (D).

4. The invention of claim 1 wherein images of separate bubble chamber film frames (F1, F2 and F3) constituting a triad of views of the same bubble chamber events are sequentially moved across said linear array (A) of detectors (D).

5. The invention of claim 1 wherein the outputs (O) of said detectors (D) form a digitization of said image for the rapid electronic recording, interpretation and selection of transparent bubble chamber picture tracks on said film frame (F3) by a computer (C).

6. The invention of claim 1 wherein said film frame (F3) is sequentially moved to stationary spaced apart locations for the normal and orthogonal sequential scanning of said film by separate rotating mirrors (RM3 and RM'3) forming a single electronic optical unit with said linear array of detectors.

7. The invention of claim 1 wherein said image of said film frame (F3) and an image of a precision grating (G) are simultaneously moved respectively across said linear array (A) of detectors (D) and detectors (E) at the end of said array (A) for the accurate referencing of said image of said bubble chamber film in time and space.

8. A device for scanning a web (W1) of bubble chamber film of the type forming a frame (F3) having discrete portions of different optical density corresponding to the paths of charged particles in a bubble chamber, said device producing electrical output signals (O) that correspond to said optical densities associated with finite areas of said film, comprising:

(a) film transport means (T) for selecting and aligning said frame (F3) for scanning;
(b) means (L3, M3 and RM3) for projecting an enlarged image of said selected and aligned frame (F3) onto an image surface and for sweeping said image surface at a controlled rate in a direction perpendicular to a line segment of said image surface so as sequentially to focus on said line segment successive adjacent segments of said image;
(c) means having a plurality of discrete photo-sensitive detectors (D) arranged in a linear array (A) along said line segment for detecting the incident light intensity and its variation with time of said focused segments of said image; and
(d) grating means (G) for relating the output signals in time and space to specific areas of said film frame (F3).

9. The invention of claim 8 in which said detectors (D) comprise 1000 solid state field effect transistors 250 microns square arranged in a linear array (A) with a distance between centers of 1.5 mm.

10. The invention of claim 8 in which said means (L3, M3 and RM3) for projecting and sweeping an enlarged image of said selected and aligned frame (F3), comprises rotating mirrors, stationary mirrors, and lenses for moving an image of said frame across said detectors (D).

References Cited

UNITED STATES PATENTS

| | | | |
|---|---|---|---|
| 3,281,603 | 10/1966 | Goldmark | 250—219 |
| 3,345,120 | 10/1967 | Palmer | 350—6 |
| 3,435,243 | 3/1969 | Webb | 250—219 |

RALPH G. NILSON, Primary Examiner

T. N. GRIGSBY, Assistant Examiner

U.S. Cl. X.R.

250—220; 350—6